No. 716,130. Patented Dec. 16, 1902.
C. P. STEINMETZ.
ALTERNATING CURRENT ELECTRIC METER.
(Application filed Feb. 11, 1898.)
(No Model.)
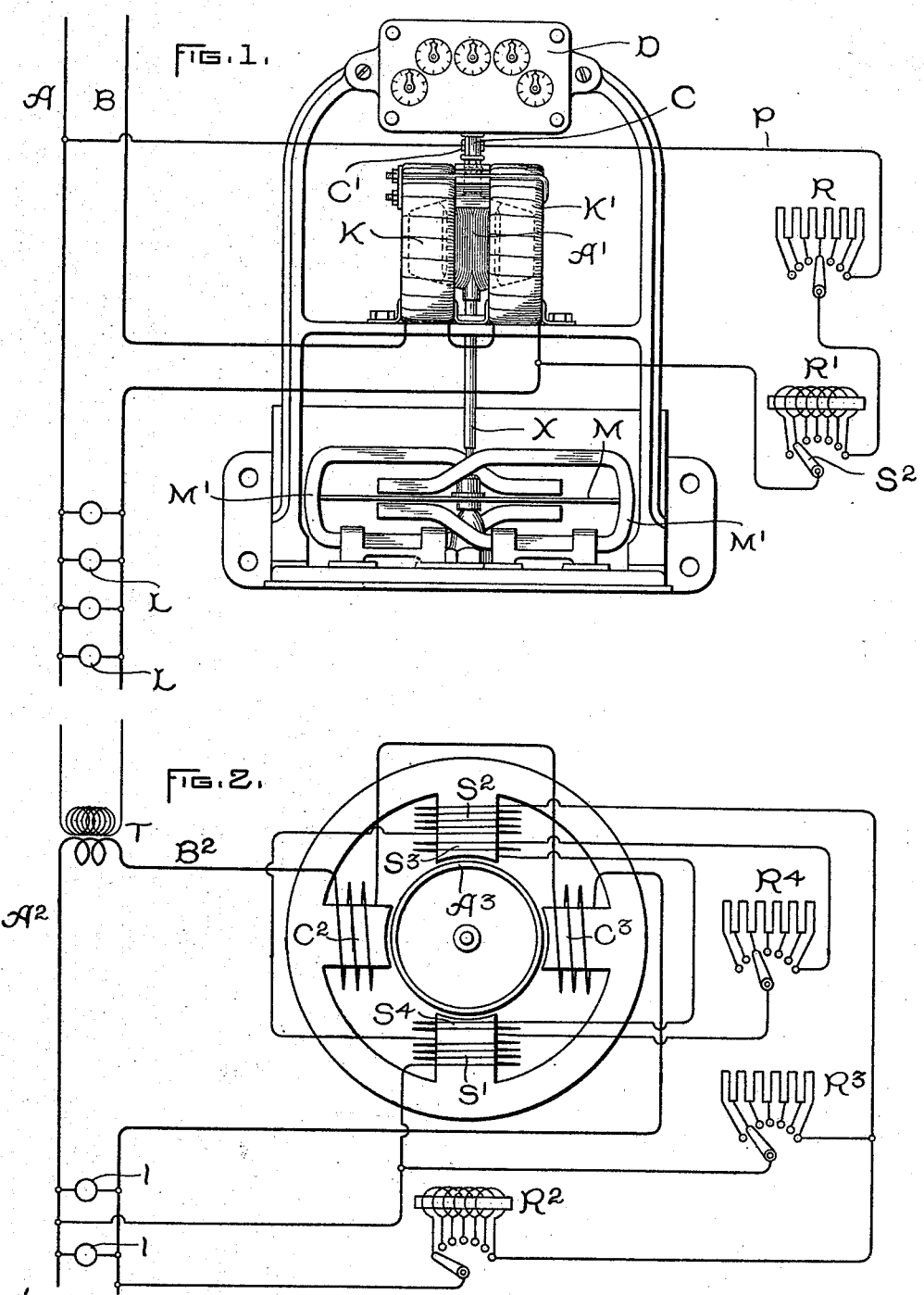

UNITED STATES PATENT OFFICE.

CHARLES P. STEINMETZ, OF SCHENECTADY, NEW YORK, ASSIGNOR TO THE GENERAL ELECTRIC COMPANY, A CORPORATION OF NEW YORK.

ALTERNATING-CURRENT ELECTRIC METER.

SPECIFICATION forming part of Letters Patent No. 716,130, dated December 16, 1902.

Application filed February 11, 1898. Serial No. 669,901. (No model.)

*To all whom it may concern:*

Be it known that I, CHARLES P. STEINMETZ, a citizen of the United States, residing at Schenectady, in the county of Schenectady, State of New York, have invented certain new and useful Improvements in Alternating-Current Electric Meters, of which the following is a specification.

In alternating-current systems in which power is supplied to inductive translating devices—for example, such as induction-motors—a part of the current is almost invariably wattless—that is, it does not represent power delivered. Nevertheless, since wattless currents represent power consumed on the lines and in transformers, because of the $C^2R$ loss, and since such currents consume generator capacity, it is fair that a charge should be made, though perhaps at a smaller rate than the rate charged for actual power delivered, for this loss in the system, since such a charge would form a check on customers using motors too large for the work demand upon them and running, therefore, at light loads with consequent excessive lagging current. Moreover, the fact that some charge is made for wattless current constitutes an inducement for customers to cut out of circuit entirely, except when in actual use, all inductive apparatus, such as transformers or motors, which take at no load an excessive lagging current.

It is the object of my invention to provide a meter recording not only the power delivered, but also a part, at least, of the power lost on the line due to the lagging or wattless currents. I accomplish this object by producing in some of the actuating-coils of a meter, such as the Thomson recording-wattmeter or an induction-wattmeter or whatever type may be preferred, a relative inductive reactive effect and a resultant relative shifting of the magnetomotive forces which act on the armature to cause it to actuate the registering or indicating mechanism. In a Thomson recording-wattmeter, for instance, by properly adjusting the relative amount of reactance and non-inductive resistance in the potential circuit of the instrument the amount of lagging currents recorded can be adjusted as desired, and consequently a corresponding rate of charge can be established.

The power in an alternating-current circuit is equal to volts into amperes multiplied by the cosine of the phase angle between the volts impressed on the circuit and the current flowing. The readings in a recording-wattmeter are proportional to the current in the potential circuit—that is, the current due to the difference of potential across the mains into the main current multiplied by the cosine of the angle of phase difference between these two currents. Moreover, if the potential circuit is in phase with the impressed volts, the reading of the wattmeter will be proportional to the power.

I have found that if we insert in the potential circuit of the wattmeter a suitable inductive reactance, and adjust it so as to cause the magnetism due to the current in the potential circuit to lag, say, twenty degrees behind the phase which it would have were the instrument to register the actual energy consumed, and then so adjust the wattmeter as to read correctly at non-inductive load by properly proportioning the windings or adjusting the recording or registering mechanism, the reading of the instrument will not be volts by amperes by cosine of the phase angle between the impressed volts and the resultant amperes, but will be volts by amperes by cosine of an angle twenty degrees less than the angle of lag in the circuit. The cosine of this angle is obviously greater than the cosine of the phase angle itself. For example, suppose the lag of the current due to the inductive load is twenty degrees, then the power delivered is volts by amperes by cosine of the angle of twenty degrees, the cosine of twenty degrees being .94—, that is, in this instance, the actual power delivered is slightly less than the apparent power.

Let us consider what would be the readings of the instrument when a device having inductance or an inductive resistance is included in the potential circuit of the wattmeter. It is evident if the instrument is not readjusted that it will register less than the energy consumed in the circuit, since the energy consumed with a non-inductive load on the circuit is volts by amperes, while the readings of the instrument would be volts by amperes by .94. Therefore the instrument should be readjusted to give at non-inductive load the same reading—that is, volts by amperes—as if the inductive resistance was omitted from the potential-current circuit. The instrument is therefore made to read higher than the equation would make it read in the ratio which unity bears to the cosine of twenty degrees. Suppose the main-line current lags by $x°$, then the difference of phase between the current in the main line and that in the potential circuit is $x° - 20°$, and the equation would give for the meter registration volts by amperes by cos. $(x° - 20°)$; but as the meter has been readjusted as above described, it results that its reading would be volts by amperes by $\frac{\text{Cos.}(x° - 20°)}{\text{Cos. } 20°}$.

With the reactance causing a lag of twenty degrees in the potential circuit, the instrument being adjusted to read correctly at non-inductive loads, the reading of the instrument will be at twenty-degrees load lag, volts by amperes by $\frac{\text{Cos.}(20° - 20°)}{\text{Cos. } 20°}$, or $\frac{\text{Cos. } 0°}{\text{Cos. } 20°}$, or $1.06+$, so that the instrument will register a small percentage over what it would register with the inductance eliminated from the potential circuit, and therefore there would be a small charge for wattless current at a time when the lag caused by load is relatively small. If the lag of the current is comparatively great—for example, say sixty degrees—the power of the circuit is one-half the volts by amperes, since the cosine of sixty degrees is one-half. The reading of the instrument would be in this case volts by amperes by $\frac{\text{Cos.}(60° - 20°)}{\text{Cos. } 20°}$, or volts by amperes by $\frac{\text{Cos. } 40°}{\text{Cos. } 20°}$, or volts by amperes by .83. In this case it will be apparent that the instrument registers about 1.66 times the actual power delivered. In this case the charge for wattless currents is evidently almost two-thirds of the charge for energy-current. If the lag of the circuit is eighty degrees, then the instrument will indicate volts by amperes by $\frac{\text{Cos. } 60°}{\text{Cos. } 20°}$, which is volts by amperes by $\frac{.50}{.94}$—that is, the instrument instead of charging .17+ times the volt-amperes charges .54 times the volt-amperes. In this case the charge is for the actual power and for something over one-third of the wattless currents.

By adjusting the relative amount of inductance in the potential-current coils of the wattmeter we can vary the readings of the instrument, so as to charge at different rates of increase, according to different adjustments made. By cutting out entirely the inductive resistance or reactance we can change the instrument back into a wattmeter of the ordinary type, which registers simply the actual power supplied, in which case the reading of the recording-wattmeter becomes again potential current by main current by cosine of the angle between the two. By properly adjusting the non-inductive and inductive resistance of the potential circuit of the wattmeter in different proportions we get different readings, so that the instrument when combined with a regulable inductive and a regulable non-inductive resistance in its potential-current circuit becomes a multiple-rate meter—that is, a meter capable of giving different readings in accordance with the relative amount of reactance in its potential-current circuit. The same principle can be applied to any recording-wattmeter based on the mutual action of potential-current coils and the main-current coils. For instance, in the induction-wattmeter, where the currents in the two coils are approximately ninety degrees separated from each other and act on an armature wound with closed coils or on simply a disk of conducting material in which eddy-currents are generated, the same effect may be secured by making the potential current lag more than ninety degrees behind the impressed electromotive force, as by producing an inductive reactive effect in certain of the coils of the instrument, and by adjusting this inductive effect various readings may be obtained.

It results from a motor constructed as described that a customer may be given a certain discount for taking leading currents; but this is not objectionable, since such currents tend to raise the power factor of the system.

Referring to the drawings, Figure 1 illustrates my invention in connection with a Thomson recording-wattmeter, in which A B represent constant-potential mains supplied with energy or through intermediation of transforming apparatus; and Fig. 2 represents, diagrammatically, the application of my invention to an induction-wattmeter.

In Fig. 1, A' indicates the armature-coils of the wattmeter, and K K' indicate the field-magnet coil of the wattmeter, here shown as of a usual and well-known construction. X is the shaft which carries the armature-coils, supported in the usual manner in adjustable jewel-bearings. M is the damping-disk acted upon by the permanent magnets M' M'. L L are incandescent lamps or other similar devices arranged in multiple on the constant-potential circuit A B. C is the commutator of the armature, upon which rest brushes C', by which commutator and brushes a current in multiple with the mains A B and corresponding in magnitude and phase to the electromotive force impressed on the translating devices may be supplied to the coils A'. D represents any of the well-known forms of registering mechanism, such as a train of gearing with indicating-dials. R is an adjustable non-inductive resistance of any well-known type, and R' is an inductive resistance or reactance device, such as is involved in my invention. It will be noticed that this reactance device is adjustable. The points of contact of the coils over which the switches pass are connected at such points of the winding of the inductive resistance, with relation to the non-inductive resistance, the instrument, and the circuit in which it is connected, as to permit the adjustment which renders my apparatus a meter of the multiple-rate type.

By placing the switch-arm $S^2$ on the second contact, as shown, enough of the coils of the inductive resistance will be in circuit with the armature A' and potential circuit P to cause a lag of the current in the armature of, say, twenty degrees. When placed on the next contact to the right, a lag of thirty degrees would be produced in the armature-circuit, and so on.

Turning to Fig. 2, which illustrates, as I have stated, my invention in connection with an induction-wattmeter in outline, T represents a transformer through which energy is supplied at constant potential and lowered pressure to the circuit $A^2 B^2$, in which are arranged incandescent lamps or other translating devices $l\ l\ l$. Of course the energy may be supplied to the lamps directly without the use of a transformer. $C^2\ C^3$ represent the main-current coils of the wattmeter, and $S'\ S^2$ represent the potential coils of the wattmeter connected across the mains $A^2\ B^2$. These coils conjointly act upon an armature $A^3$, here shown as a cylinder of conducting metal. $R^2$ is an inductive resistance connected, as usual, in the circuit with the potential coils to produce a lag of current in the potential coils as near ninety degrees as possible; but the current in the potential coils with the arrangement thus far described can never lag quite enough behind the impressed electromotive force to cause the meter reading at all loads to be "E C cos. $\varphi$," when E is the electromotive force, C the current, and $\varphi$ the angle of lag. My invention requires, however, that the reading should correspond to "E C cos. $(\varphi + \theta)$," or, say, "E C cos., $(\varphi + 20°)$." It therefore becomes necessary to artificially retard the phase of the current flowing in the coils $S'\ S^2$. I prefer to produce this result by shunting them with a device which acts to retard the phase of the current therein—such, for example, as a non-inductive resistance. (Shown at $R^3$.) This device will divide the current in the branch circuit, already lagging by, say, eighty-five degrees, into a leading component and a lagging component. The lagging component, which will obviously be behind the current in the coil $R^2$ in phase, will pass through the coils $S'\ S^2$. By properly adjusting the effect of this phase-retarding device, which is here shown as an adjustable resistance, the lag of the current in the potential coils may be made, for example, one hundred and ten degrees.

In addition to the resistance $R^3$, I may wind a coil or set of coils $S^3\ S^4$ on the magnetic circuit of the coils $S'\ S^2$. These coils, closed on themselves, with or without an adjustable resistance $R^4$, will tend to beat back the flux due to the coils $S'\ S^2$ and to retard it in phase, as is well understood in the art, and produce an additional lag in the magnetism due to the potential coils. Though I have shown two separate devices acting to retard this flux working conjointly, it is obvious that either one alone may be used. By varying the amount of resistance in these respective sets of coils, since the amount of current flowing through them is thus varied, we can vary their relative magnetizing effect, and thus in turn effect the displacement in phase of their resultant magnetic flux. Of course any well-known arrangement of varying the number of turns in either or both of these sets of coils may be used with the same effect in substance as the variable non-inductive resistances produce in either or both.

I do not limit myself to any particular form of alternating-current electrical measuring instrument, since I consider that I am the inventor of the broad method for so shifting the relationship of the actuating magnetomotive forces which set in motion the armature of an alternating-current indicating or registering instrument, such as a meter or galvanometer, as to establish such lag either in current or magnetomotive forces, as will when the registering mechanism is properly adjusted record a predetermined amount of wattless current in an alternating-current circuit.

I make no claims herein to the apparatus shown and described in this case, the same being shown, described, and claimed in my application, Serial No. 104,970, filed April 28, 1902, which application is a division of the present application.

What I claim as new, and desire to secure by Letters Patent of the United States, is—

1. The method of registering a predetermined proportional amount of wattless current in an alternating-current circuit, which consists in producing in one or more of the coils of an electric registering or indicating instrument, an inductive reactive effect and a resultant relative shifting of the actuating magnetomotive forces, corresponding to the proportionate amount of wattless current to be measured, and actuating properly-adjusted registering or indicating mechanism, by the said magnetomotive forces due to the currents in the coils of the instrument.

2. The method of registering a predetermined proportional amount of wattless current in an alternating-current circuit, which consists in producing in one of the coils of an electric registering or indicating instrument, a predetermined lag of current corresponding to the proportionate amount of wattless current to be measured and actuating properly-adjusted registering or indicating mechanism by the currents in the coils of the instrument.

3. The method of registering a predetermined proportionate amount of wattless current in an alternating-current circuit, which consists in producing in one of the coils of an electric registering or indicating instrument a predetermined lag of current, and thus causing a different degree of phase difference between the currents in the respective coils of the instrument than normally would exist, and actuating properly-adjusted registering or indicating mechanism by the currents of adjusted phase flowing in the coils of the instrument.

4. The method of registering a predetermined proportional amount of wattless current flowing in an alternating-current circuit, in addition to registering the actual power delivered, which consists in producing, in one of the coils of an electric registering instrument, a predetermined lag of current, and thus causing a different degree of phase difference between the currents in the respective coils of the instrument than normally would exist, actuating the recording mechanism of the instrument by the currents of adjusted phase in the coils thereof, and causing the registering mechanism to register at such a rate as at non-inductive load to indicate the power delivered.

5. The method of registering a predetermined proportional amount of wattless current flowing in an alternating-current circuit, in addition to registering the actual power delivered, which consists in producing, in one of the coils of an electric registering instrument, a predetermined lag of current by inductive reactive action, and thus causing a different degree of phase difference between the currents in the respective coils of the instrument than normally would exist, actuating the recording mechanism of the instrument by the currents of adjusted phase in the coils thereof, and causing the registering mechanism to register at such a rate as at non-inductive load to indicate the power delivered.

6. The method of registering a predetermined proportional amount of wattless current flowing in an alternating-current circuit in addition to registering the actual power delivered, which consists in producing in one of the coils of an electric registering instrument, a predetermined lag of current by inductive reactive action, and thus causing a different degree of phase difference between the currents in the respective coils of the instrument than normally would exist, actuating the registering mechanism of the instrument by the currents of adjusted phase in the coils thereof, causing the registering mechanism to register at such a rate as at non-inductive load to indicate the power delivered, and varying this current lag to register different proportions of the wattless energy.

7. The method of registering a predetermined proportional amount of wattless current flowing in an alternating-current circuit, in addition to registering the actual power delivered, which consists in producing in one of the coils of an electric registering instrument a predetermined lag of current by inductive action, and thus causing a different degree of phase difference between the currents in the respective coils of the instrument than normally would exist, actuating the registering mechanism of the instrument by the currents of adjusted phase in the coils thereof, causing the registering mechanism to register at such a rate as at non-inductive load to indicate the power delivered, and varying this current lag to register different proportions of the wattless energy by varying the amount of relative inductive effect in the potential-current circuit of the wattmeter.

In witness whereof I have hereunto set my hand this 9th day of February, 1898.

CHARLES P. STEINMETZ.

Witnesses:
   B. B. HULL,
   C. L. HAYNES.